March 27, 1934.    J. B. CLARK    1,952,971
PORTABLE RIG FRONT
Filed Sept. 8, 1933    2 Sheets-Sheet 1

J. B. Clark INVENTOR
BY Victor J. Evans & Co.
ATTORNEY

March 27, 1934. J. B. CLARK 1,952,971
PORTABLE RIG FRONT
Filed Sept. 8, 1933 2 Sheets-Sheet 2
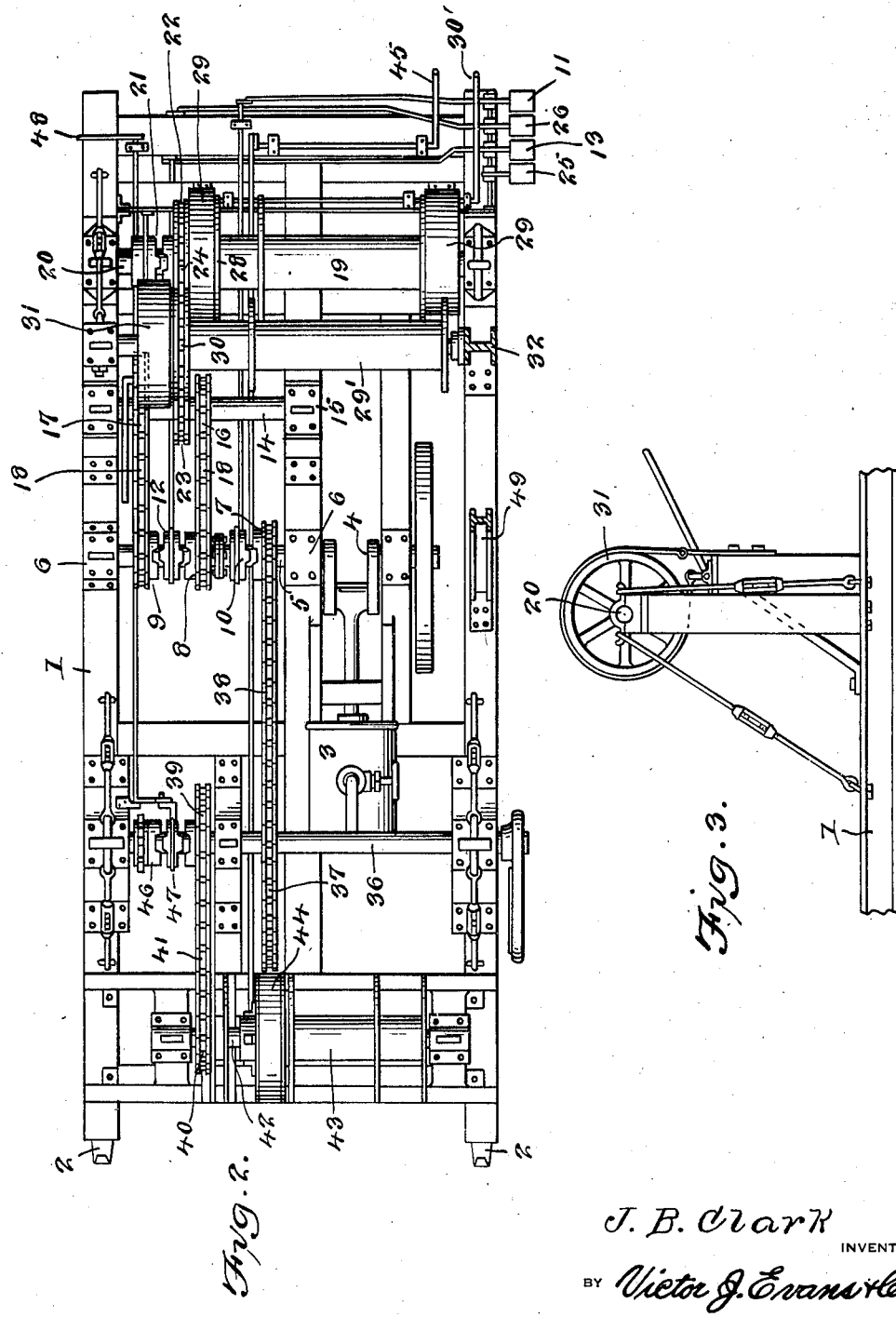
J. B. Clark
INVENTOR
BY Victor J. Evans & Co.
ATTORNEY Patented Mar. 27, 1934

1,952,971

UNITED STATES PATENT OFFICE 1,952,971

PORTABLE RIG FRONT

James B. Clark, Oklahoma City, Okla.

Application September 8, 1933, Serial No. 683,664

3 Claims. (Cl. 255—11)

The invention relates to portable rigs for oil wells and the like and has for the primary object the provision of a device of the above-stated character which will be inexpensive to construct and operate and may be conveniently moved from one place to another and will provide in a single unit a mechanism capable of successfully actuating well tools of different kinds for performing different characters of well work, such as drilling wells deeper, placing casings or tubings in wells, drilling through sand, and for removing from wells lost tools, sucker rods and the like.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a well rig constructed in accordance with my invention.

Figure 2 is a top plan view illustrating the same.

Figure 3 is a fragmentary side elevation illustrating a spool for operating a well casing positioning mechanism.

Figure 1:
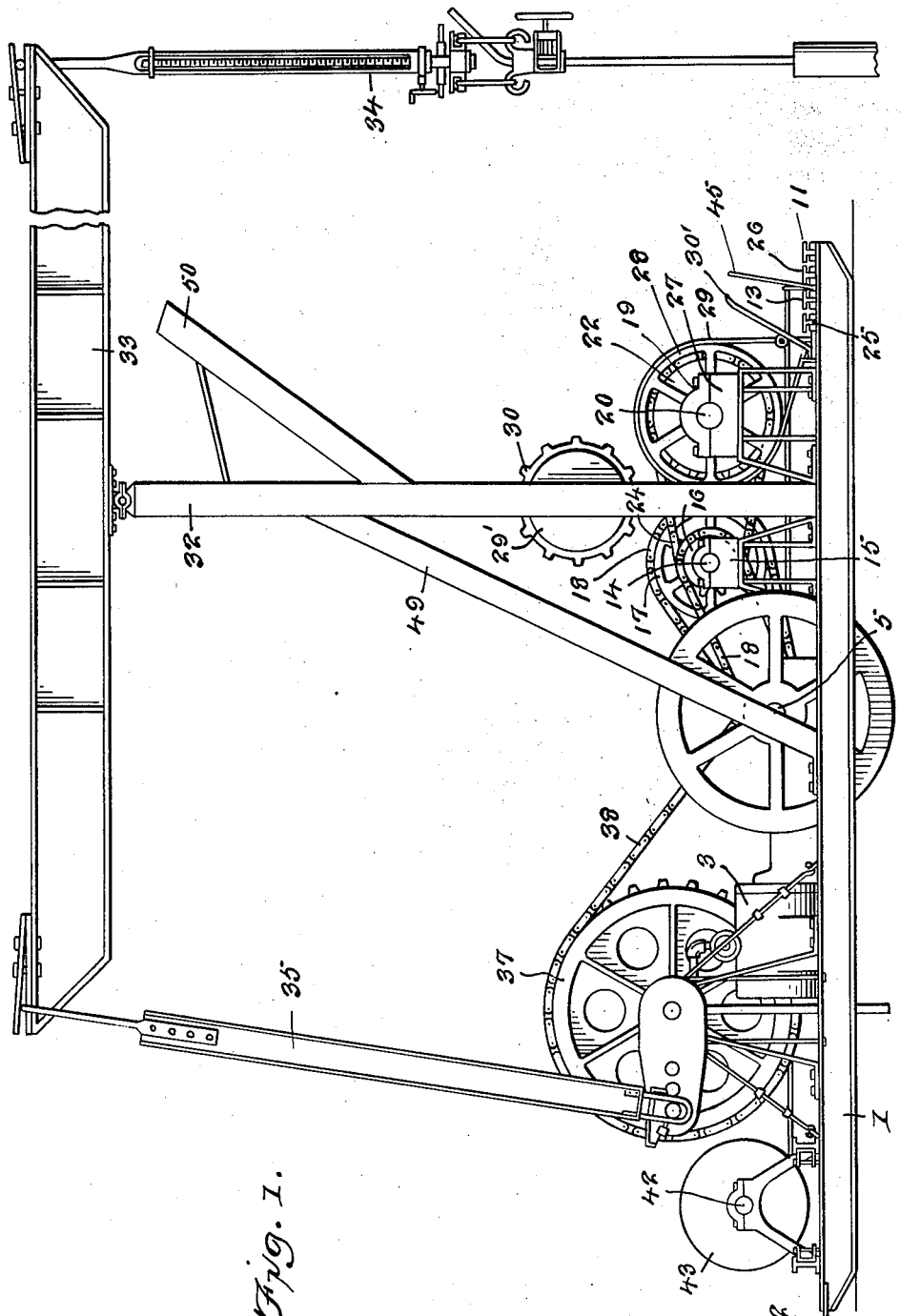

Referring in detail to the drawings, the numeral 1 indicates the main supporting frame of rigid construction and provided at one end with hooks 2 to receive anchoring cables (not shown) when the opposite end of the frame is arranged adjacent a well. A power source 3 is mounted on the frame 1 laterally of the longitudinal axis of the frame and, in this instance, is shown to be a steam engine wherein the crank shaft 4 thereof is arranged transversely of the frame and in alignment with a power take-off shaft 5 rotatably supported by journals 6 carried by the frame 1. Sprocket gears 7, 8 and 9 are journaled on the power take-off shaft and the sprocket gear 7 is connected and disconnected with the power take-off shaft by a clutch 10 controlled by a foot pedal 11 located at one side of the frame 1. A clutch 12 is employed for connecting the sprocket gears 8 and 9 to the power take-off shaft and is controlled by a foot pedal 13 located adjacent the foot pedal 11. The clutch 12 is capable of three positions, namely, a neutral position, a position to connect the sprocket gear 8 to the power take-off shaft and a position to connect the sprocket gear 9 to the power take-off shaft. Arranged adjacent the power take-off shaft on the frame 1 is an auxiliary shaft 14 supported by journals 15 on the frame 1 and has secured thereto sprocket gears 16 and 17. The sprocket gears 16 and 17 vary as to size with respect to each other and are connected to the sprocket gears 8 and 9 by sprocket chains 18 so that the auxiliary shaft 14 may be driven from the power take-off shaft at different speeds.

A drum or spool 19 employed for operating a drilling line is journaled on its supporting shaft 20 carried by the frame 1 adjacent the front end of the latter and a clutch 21 is provided between the spool 19 and the sprocket gear 22, the latter being connected to a sprocket gear 23 secured to the auxiliary shaft 14 by a sprocket chain 24. Thus it will be seen that the spool 19 may be driven at different speeds and may be connected and disconnected with the power means by the clutch 21, the latter being controlled by a foot pedal 25. The clutch 12 is controlled by a foot pedal 26.

As shown in Figure 2, the clutch pedals heretofore described are all grouped in close proximity to each other so that the operator may control the various clutches when standing at one position adjacent to the frame 1. The journals which support the shaft 20 are carried by supports 27 and the spool 19 is equipped with brake drums 28 engaged by brakes 29 controlled by a lever 30', whereby the rotation of the spool 19 may be controlled when disconnected from the sprocket 22.

Arranged adjacent to and in a plane above the spool 19 is a spool 29' journaled in suitable bearings carried by the frame. The spool 29' is employed for operating mechanism designed especially for setting casings or tubings in wells and has secured thereto a sprocket gear 30 adapted to have the sprocket chain 24 trained thereover when removed from the sprocket gear 22, thus it will be seen that the spool 29 may be driven at different speeds from the power source. A brake mechanism 31 is provided for the spool 29.

Rising from the frame 1 is a Samson post 32 pivotally supporting a walking beam 33 and the latter carries at one end a mechanism 34 for drilling wells, while the opposite end is connected to a pitman 35. A crank shaft 36 is rotatably supported by the frame 1 rearwardly of the power take-off shaft and the crank thereof has the pitman 35 journaled thereto. The shaft 36 has secured thereto a sprocket wheel 37 connected to the sprocket wheel 7 by a sprocket chain 38. A sprocket gear 39 is secured to the shaft 36 and is connected to a sprocket gear 40 by a sprocket chain 41. The sprocket gear 40 is secured to a shaft 42 having mounted thereon a spool or drum 43 and the latter is equipped with a brake mechanism 44 controlled by a hand lever 45. It is to be understood that the spool 43 is secured direct to the shaft 42 and is employed for operating a standard sand reel assembly (not shown).

A sprocket gear 46 is journaled on the crank shaft 36 and is connected and disconnected to the latter by a clutch 47 controlled by a hand lever 48. The sprocket gear is employed for driving any auxiliary well mechanism not provided for in this unit.

The post 32 is reinforced by a brace 49 and also carries a rest 50 for supporting the walking beam 33 during the non-use of the latter.

From the foregoing description taken in connection with the accompanying drawings it will be seen that a device has been provided wherein a series of mechanisms employed in various well operations can be operated from a single power source through a series of spools or drums designed especially for the respective mechanisms and that the various spools and power source comprise a single unit when assembled upon the main frame 1 capable of being moved from one place to another with ease and at a minimum cost. Further, it is to be noted that the drives between the power source and various spools or drums and crank shaft of the unit are capable of successful operation without the danger of slippage by the elimination of belts heretofore employed in machines of similar character and which cause a loss of power due to slippage.

With the machine of the character heretofore described, well drilling, tube placing, boring through sand and the removal of lost tools from wells can be easily and quickly accomplished.

The engine or power source is centrally located upon the main frame of this device so that more efficient and convenient distribution of power to the various working units may be had.

While I have shown and described the preferred embodiment of my invention, it will be understood that minor changes in construction, combination and arrangement of parts may be made without departing from the spirit and scope of my invention, as claimed.

What I claim is:

1. A portable rig front comprising a portable unitary base frame, a prime mover mounted thereon with its power take-off shaft disposed transversely of said base frame and substantially midway between the ends thereof, a plurality of cable spools mounted on said base frame on transverse axes at one side of said power take-off shaft, fast and slow speed driving connections between said power take-off shaft and said cable spools, a walking beam crank shaft and a sand reel mounted on transverse axes on said base frame on the opposite side of said power take-off shaft from said cable spools, and clutch controlled driving connections between said power take-off shaft and said crank shaft and sand reel for driving said crank shaft and sand reel independently of said cable spools.

2. A portable rig front comprising a portable unitary base frame, a prime mover mounted thereon with its power take-off shaft disposed transversely of said base frame and substantially midway between the ends thereof, a plurality of cable spools mounted on said base frame on transverse axes at one side of said power take-off shaft, an auxiliary shaft journaled to the base frame and located between the power take-off shaft and said spools, fast and slow speed driving connections between said power take-off shaft and the auxiliary shaft, selective driving connections between the auxiliary shaft and said spools, a walking beam crank shaft and a sand reel mounted on transverse axes on said base frame on the opposite side of said power take-off shaft from said cable spools, and clutch controlled driving connections between said power take-off shaft and said crank shaft and sand reel for driving said crank shaft and sand reel independently of said cable spools.

3. A portable rig front comprising a portable unitary base frame, a prime mover mounted thereon with its power take-off shaft disposed transversely of said base frame and substantially midway between the ends thereof, a plurality of cable spools mounted on said base frame on transverse axes at one side of said power take-off shaft, an auxiliary shaft journaled to the base frame and located between the power take-off shaft and said spools, fast and slow speed driving connections between said power take-off shaft and the auxiliary shaft, selective driving connections between the auxiliary shaft and said spools, a walking beam crank shaft and a sand reel mounted on transverse axes on said base frame on the opposite side of said power take-off shaft from said cable spools, a clutch controlled driving connection between said power take-off shaft and said crank shaft, and a second clutch controlled driving connection between said crank shaft and sand reel, the first and second mentioned clutch controlled driving connections permitting driving of said crank shaft and sand reel independently of said cable spools.

JAMES B. CLARK.